H. C. STOUFFER.
NUT-LOCK.

No. 187,679. Patented Feb. 20, 1877.

Witnesses:
J. H. Rutherford
Lloyd Norris

Inventor
Hiram C. Stouffer,
By Johnson & Johnson
Att'ys.

UNITED STATES PATENT OFFICE.

HIRAM C. STOUFFER, OF CANFIELD, ASSIGNOR OF ONE-HALF HIS RIGHT TO LEMUEL T. FOSTER, OF YOUNGSTOWN, OHIO.

IMPROVEMENT IN NUT-LOCKS.

Specification forming part of Letters Patent No. 187,679, dated February 20, 1877; application filed September 11, 1876.

*To all whom it may concern:*

Be it known that I, HIRAM C. STOUFFER, of Canfield, in the county of Mahoning and State of Ohio, have invented a new and useful Improvement in Lock-Nuts, of which the following is a specification:

My present invention is designed as an improvement upon lock-nuts patented to me January 10, 1872, and April 2, 1872. In the first of these patents the nut is combined with a follower or washer, the adjacent surfaces of which are provided with corresponding projections and inclined recesses, which inter-match and form the lock, while the opposite face of the follower or washer has ratchet-teeth, to form a bearing against a similar-toothed washer or other surface. In the latter patent the teeth of the follower or washer form the bearing on one side, and the lock is made by inclined-edge lips on the other side, to prevent the nut from turning back; but in both of these devices the follower or washer and the nut are liable to become loose and remain so while keeping their lock intact. In the patent of Wetmore, January 21, 1873, my first lock-nut is combined with a fish-plate, provided with ratchet-teeth, and the follower or washer can only be locked tight by turning the nut back; but both the follower or washer and the nut are liable to become loose and remain so, the nut having sufficient freedom to turn a little both on and off the bolt; but when set neither can be removed.

My present improvement is designed to avoid the objections stated, and to give a firm joining of the rail-joints by supporting them with a constant binding action of the nuts, and give a firm support to both ends of the rails. This I effect by having the contiguous surfaces of the nut and its follower or washer wedge-shaped, with uninterrupted surfaces, and with one end of each larger and heavier than the other, with the larger end of the nut corresponding with the smaller end of the follower or washer, to give a binding action at all times upon each, either by the turning of the nut or of the follower, and by this means hold the ends of the rails or other parts firmly joined and supported by the bolts and fish-plates. The heaviest ends of the nut and the follower or washer control the direction in which they turn by the jarring action of the rails, and their action is to bind tighter, and in no event can either remain loose. This gives the greatest advantage in fish-plate lock-nuts, as the importance is as great in preserving a firm joining of the rails as to simply prevent the nuts from coming off.

Figure 1:
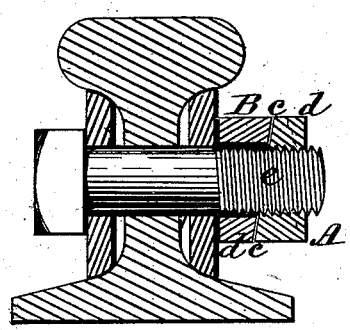
Figure 2:
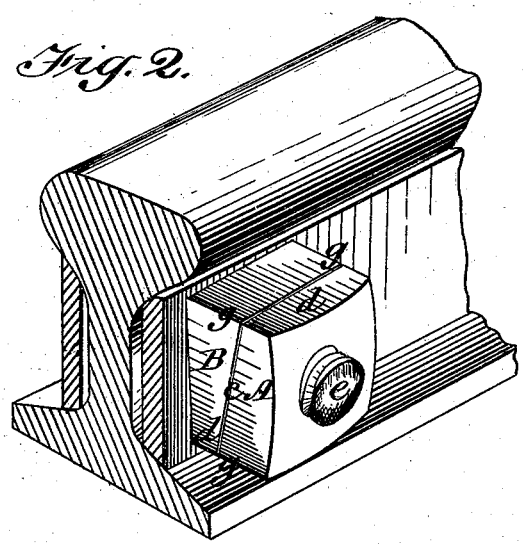
Figure 3:
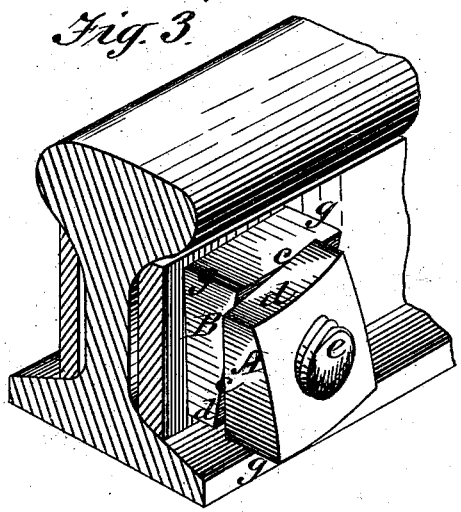
Figure 4:
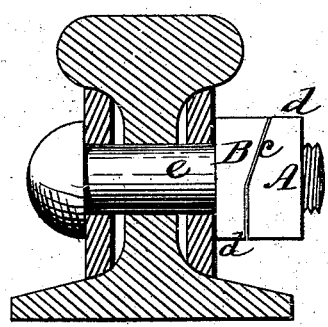

In the accompanying drawings, Figure 1 represents a sectional view of my improved lock-nut applied to the fish-plate connections of railroad-rails; Fig. 2, a view, in perspective, of the same, showing the plain-surface wedge-nut and wedge-follower or washer tightened; Fig. 3, a similar view, showing the two wedge parts in tight positions should either of them turn; and Fig. 4, a modified form of wedge-nut and wedge-follower or washer.

The nut A is screw-threaded and has a plain wedge-face, and the follower or washer B is of coincident form, and has also a plain wedge-face to match exactly the wedge of the nut, so that they are both turned together off and on the bolt $e$ by the wrench, the same as if they were a single nut. They cannot be put on or taken off separately and perform their proper function. Their contiguous faces $c$ are inclined across the whole or half the face-surface, and without recesses or projections, so that in turning one upon the other either way they will bind and become tight upon the bolt $e$ and against the fish-plate, and when fitted together their wedge ends $d$ are in opposite directions.

I make the wedge of sufficient taper to form a tight lock should the two parts become separated equal to two revolutions of the two parts together. If such a contingency should occur, the nut or the follower would still bind upon each other by the action of their heavy ends, and this whether the nut or the follower should become the turning part.

The nut and the follower or washer must have coincident angles $g$, to fit the wrench. Either part can turn independent of the other, and in either direction, and thus tighten and bind the nut at all times.

The device requires no appliances on the fish-plate, and can be applied the same as a simple nut upon any bolt used for machinery, vehicles, &c.

The lock is effective in whatever position the nut may be tightened, and if either of the parts should turn neither can remain loose, as there is no play whatever between the parts when screwed home, such as must necessarily occur between ratchet-teeth and wedge-recessed projections.

I claim—

The combination, with a bolt, of a wedge-shaped nut and a wedge-shaped washer or follower, the nut and washer having in cross-section like size and shape, and their meeting surfaces being planes without locking recess or projection, and being oblique to the axis of the bolt, whereby both may be worked on or off the bolt togther, and either may turn in either direction to lock the nut on the bolt.

In testimony whereof I have affixed my signature in the presence of two witnesses.

HIRAM C. STOUFFER.

Witnesses:
　A. E. H. JOHNSON,
　J. W. HAMILTON JOHNSON.